US006935700B1

(12) United States Patent
Nerette

(10) Patent No.: US 6,935,700 B1
(45) Date of Patent: Aug. 30, 2005

(54) PREGNANCY SEAT BELT

(76) Inventor: Stefan Nerette, P.O. Box 451926, Sunrise, FL (US) 33345

( * ) Notice: Subject to any disclaimer, the term of this patent is extended or adjusted under 35 U.S.C. 154(b) by 0 days.

(21) Appl. No.: 10/710,083

(22) Filed: Jun. 17, 2004

(51) Int. Cl.$^7$ ............................................. B60R 22/12
(52) U.S. Cl. ................ 297/467; 297/DIG. 6
(58) Field of Search ............... 280/801.1; 297/467, 297/464, 488, 466, 256.15, 255, 250.1, DIG. 6

(56) References Cited

U.S. PATENT DOCUMENTS

| | | | |
|---|---|---|---|
| 4,610,463 A | * | 9/1986 | Efrom .................. 280/751 |
| 5,005,865 A | | 4/1991 | Kruse |
| 5,257,854 A | * | 11/1993 | Korneliussen .............. 297/468 |
| 5,352,024 A | * | 10/1994 | Grene ........................ 297/485 |
| 5,624,136 A | | 4/1997 | McGlothlin et al. |
| 6,322,150 B1 | | 11/2001 | Harper et al. |

* cited by examiner

Primary Examiner—Milton Nelson, Jr.
(74) Attorney, Agent, or Firm—Michael L. Greenberg, Esq.; Greenberg & Lieberman

(57) ABSTRACT

The pregnancy seatbelt with facility of quick release has a seat mat adapted to be placed on the seat of the automobile and secured thereto by an elongated securing strap connected to the seat mat and fastened about a lower portion of the vehicle seat back. Criss-cross elastic straps sewn into the seating mat in a criss-cross pattern and a VELCRO hook and loop material attachment joining both criss-cross elastic strap and adapted to capture/hold the lap strap of vehicle seat belt. The VELCRO hook and loop material attachment is positioned in such a manner as to pull the criss-cross elastic straps extending upwardly and the lap strap portion downwardly in position over the hypogastric area of the lower abdominal region of the user. In this position, the VELCRO hook and loop material attachment directs the seatbelt in such a manner as to extend across the lower abdominal region of the user thereby avoiding contact with the womb area.

8 Claims, 2 Drawing Sheets

PREGNANCY SEAT BELT

BACKGROUND OF INVENTION

The present invention relates in general to a safety system attached to the seat belt system installed in a motor vehicle such as a seat belt positioning assembly for positioning a seat belt in a preferred position along the lower abdominal region of a pregnant person so as to avoid the womb and more particularly to a pregnancy seat belt, for reposition of the lap portion of the seat belt called a lap strap below the belly button, which in turn reduces the amount of pressure placed on the fetus/stomach.

In most countries, seat belts and head restraints are the only elements of vehicle equipment the use of which is defined by the Traffic Code. The analysis of car accident statistics and of survival statistics of their victims indicates the necessity to use seat belts by all people in the car (the driver and all passengers). The use of seat belts by pregnant women should also be considered necessary, despite the fact that the Polish Traffic Code exempts them from this requirement. The risk of injury to the pregnant woman and the fetus induced by properly used (fastened) seat belts is much lower that is the risk of injury caused by sudden deceleration resulting from abrupt braking or a collision of the vehicle which she is in.

Most women know that diet, rest and exercise are important during pregnancy. But many mothers to be may question the wisdom of wearing a safety belt, fearing that the belt may injure a developing fetus in the event of a car crash. In reality, both mother and baby are far less likely to be harmed in a crash if a pregnant woman is buckled up. The greatest risk to a developing fetus is injury to the mother. Properly wearing a seat belt reduces the risk of fatal injury to front seat passenger occupants by 45 percent in a car and 60 percent in a light truck. A study conducted by the University of Michigan (UMTRI) found that unrestrained or improperly restrained pregnant woman are 5.7 times more likely to have an adverse fetal outcome than properly restrained pregnant women. There is no evidence that safety belts increase the chance of injury to the fetus. For proper protection, the lower portion of a lap/shoulder belt should be worn under the abdominal bulge, as low on the hips as possible, and against the upper thighs. The belt should never be placed above the abdomen, since this could cause major injuries in a crash. The upper part of the lap/shoulder belt should be placed between the breasts. Never slip the upper part of the belt off the shoulder or behind your arm. Both the lap and shoulder portions of the belt should be adjusted as snugly as possible.

Women should wear a lap/shoulder belt throughout their pregnancy. In a crash, the lap/shoulder belt will keep the mother in the vehicle and will prevent her head and chest from striking the steering wheel or dashboard. It's important that other passengers in the vehicle also wear their seat belts, not only for their own safety, but to prevent violent contact with a pregnant woman in the event of a crash.

There have been numerous attempts in the prior art to design a seatbelt apparatus specifically designed for use by a pregnant person so as to avoid exerting a sudden force on the womb in the event of an accident. Most of these seatbelt assemblies in the prior art are rather complex and are designed to replace the existing seatbelt apparatus in the car, thereby becoming a permanent installation. Additionally, many of the seatbelt assemblies for pregnant persons existing in the prior art are extremely cumbersome and require a great deal of effort to secure the assembly in a fastened position about the user's body.

Accordingly, there exists a need in the present seatbelt art for a seatbelt positioning assembly for a pregnant person adapted to be used in combination with an existing seat-belt apparatus as commonly found in present day automobiles, wherein the positioning assembly is specifically designed to position and orient the seatbelt along a lower abdominal region of the pregnant person in such a manner as to avoid contact across the womb. Additionally, there is a need in the present art for a seatbelt positioning assembly for use by pregnant people which is easy to fasten and unfasten allowing the user to quickly and efficiently enter and exit the automobile in every day use.

The description of this patent addresses specifically pregnant woman. However, other people with special conditions may also find it advantageous in making use of this invention. People who are obese or have had colostomies, ureterostomies, various surgeries or abdominal abnormalities caused by disease or birth defects can also use this invention to be safer and feel more comfortable when in a motor vehicle. The description of this patent also addresses specifically cars and car seats. However, other modes of transportation such as airplanes and other seats such as wheel chairs can also use this invention.

Thus, the objective of this invention is to help prevent the lap strap of a seat belt from riding across the abdomen of a pregnant woman.

SUMMARY OF INVENTION

The present invention is directed towards a pregnancy seat belt for use in combination with an existing vehicle seatbelt apparatus being adapted to position the vehicle seat belt that is the lap strap along a lower abdominal region of a pregnant user so as to avoid undesirable contact with the womb area.

Specifically, the pregnancy seatbelt of the present invention includes a seat mat adapted to be placed on the seat of the automobile and secured thereto by an elongated securing strap connected to the seat mat and fastened about a lower portion of the vehicle seat back. A criss-cross elastic straps sewed into the said seating mat in a criss-cross pattern and a VELCRO hook and loop material attachment joining both said criss-cross elastic strap and adapted to capture/hold the said lap strap of vehicle seat belt. A sleeve portion is structured in the VELCRO hook and loop material attachment so as to be slidably received along a portion of the length of the seatbelt/lap strap, being fixedly positioned in a predetermined location along the belt. The VELCRO hook and loop material attachment is positioned in such a manner as to pull the criss-cross elastic straps extending upwardly and the lap strap portion downwardly in position over the hypogastric area of the lower abdominal region of the user. In this position, the VELCRO hook and loop material attachment directs the seatbelt in such a manner as to extend across the lower abdominal region of the user thereby avoiding contact with the womb area.

The invention accordingly comprises the features of construction, combination of elements and arrangement of parts, which will be exemplified in the construction hereinafter set forth, and the scope of the invention will be indicated in the claims.

BRIEF DESCRIPTION OF DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION

Figure 1:
FIG. 1 is a perspective view of the pregnancy seat belt of the present invention shown in use in connection with a seatbelt apparatus fastened about a user.
Figure 2:
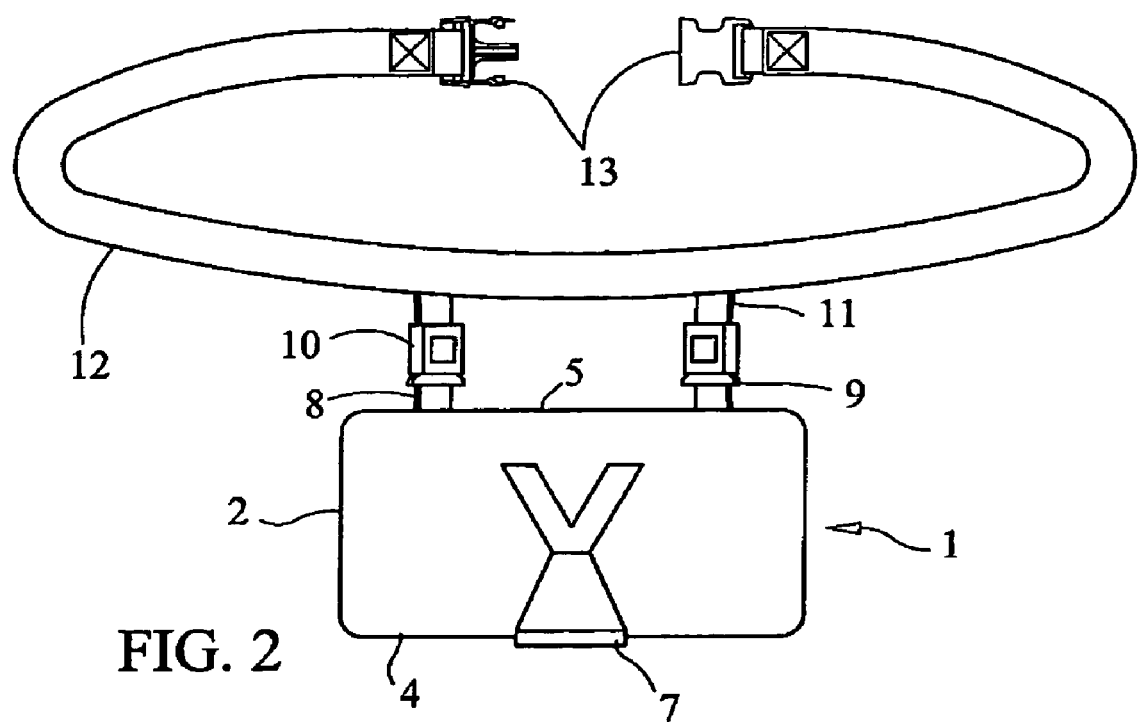
FIG. 2 is a top plan view of the pregnancy seat belt of the present invention.
Figure 3:
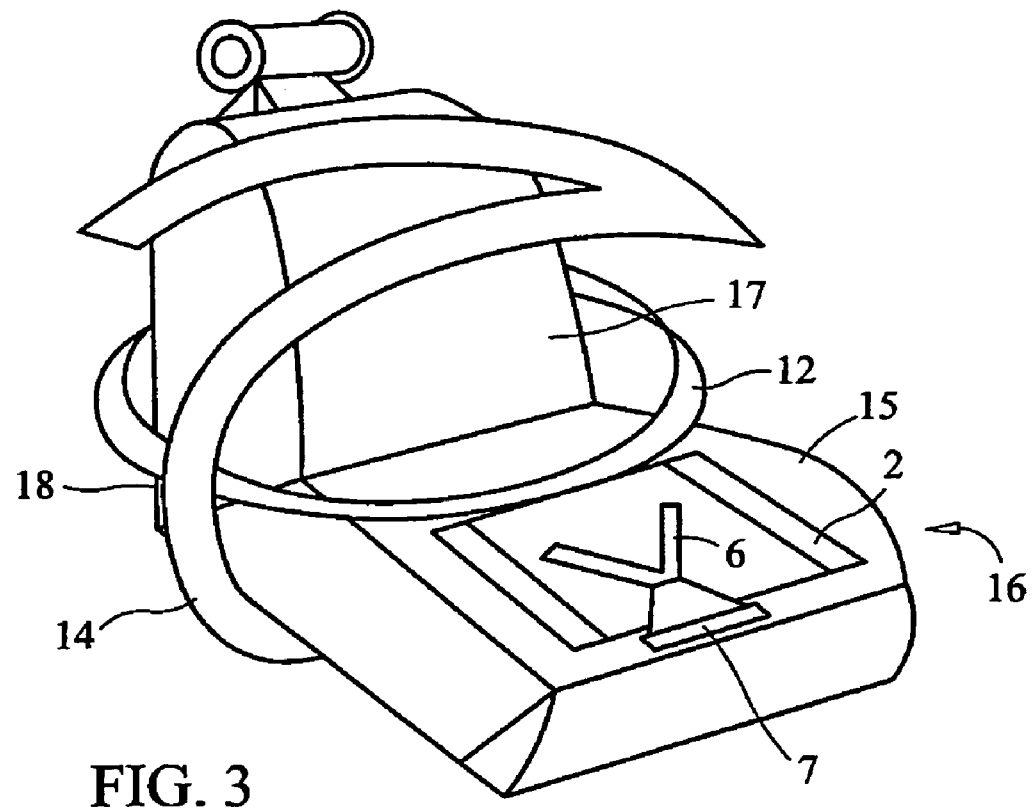
FIG. 3 is a perspective view of the pregnancy seat belt shown in combination with a seatbelt apparatus and an automobile seat.

As shown in FIGS. 1 through 3, the present invention is directed towards a pregnancy seat belt (1) for use in combination with a lap strap (14) of an automobile. Referring to FIGS. 2 and 3, the pregnancy seat belt includes a seat mat (2) made of polyester material, with measurements of 15.5×11 inches and is approximately 0.5" thick made of extremely soft material very comfortable that will not get hot or cold due to extremely weather in side the vehicle, with seating portion in four distinct colors, adapted to be placed on the lower seat portion (15) of a car seat (16). The seat mat includes an upper exposed side (3) oriented on the lower seat portion (15) so as to be positioned beneath the user's buttocks when seated in the car seat (16). The seat mat further includes a front edge (4) extending in parallel relation to the front edge of the lower portion (15) of the car seat, and a rear edge (5) positionable in the crevice between the lower seat portion (15) and a upwardly extending back portion (17) of the car seat (16). The two black elastic straps 1" in width×6" in length, namely criss-cross elastic straps (6), sewed into the said seating mat in a criss-cross pattern creating less bother for the user and a more comfortable ride. A Velcro attachment (7) having "V" shape joining said criss-cross elastic strap (6), measures 3.5" on top and narrows down to a 2" bottom designed in a anatomical shape to be a more comfortable attachment that fits in between the pregnant woman's legs. The Velcro attachment (7) opens up to capture the lap portion of the seatbelt; it is then closed with the assistance of the Velcro system. Because of the tension of the elastic straps and capture of the seatbelt in the Velcro attachment, the lap portion of the seatbelt will be correctly placed below the belly button for enhancement of comfort for the pregnant woman as illustrated in FIG. 1. The seating mat is secured with two black nylon straps (8) at rear edge (5), one in each side, 12" apart. The said straps of 2" length joined by a plastic buckle (male) (9) in each side. Each of these buckles are then attached to another nylon strap 48" long [with two straps (11) and plastic buckles (female) (10)] namely an elongate securing strap (12) further fitted with fastening buckle (13) attached to one of two opposite ends for fastening the opposite ends of the securing strap about a lower portion of the back portion (18) of the car seat (16), thereby securing the seat mat in place on the lower seat portion (15). The initial two buckles closest to the seating mat have been uniquely designed to assist in quick release/install, should the pregnancy seat belt/belly comfort need to be removed to accommodate other drivers. Since the pregnant woman has limited movement, this feature is greatly important to them; the harness will remain in position, only the seating mat needs to be removed.

I claim:

1. A pregnancy seat belt (1) for use with a vehicle seatbelt with a lap strap (14) inside a vehicle, comprising:
    a) a seat mat (2) for placement on a vehicle seat,
    b) criss-cross elastic straps (6) sewed into said seat mat (2) on an upper exposed side (3) in a criss-cross pattern,
    c) a hook and loop material attachment (7) joining said criss-cross elastic straps (6), said hook and loop material attachment (7) adapted to capture/hold the lap strap (14) of the vehicle seatbelt, and
    d) two nylon straps (8), one on each side of said seat mat, positioned at a rear edge (5) of said seat mat, joined by plastic buckles (9), each of said plastic buckles (9) are attached to an elongate securing strap (12) adapted to be secured to a vehicle seat (16).

2. A pregnancy seat belt as claimed in claim 1, wherein said seat mat (2) is soft and that will not get hot or cold due to extremely hot or cold weather inside the vehicle.

3. A pregnancy seat belt as claimed in claim 1, wherein said criss-cross elastic straps (6) are sewed into said seat mat (2) in a criss-cross pattern creating less bother for the user and a more comfortable ride.

4. A pregnancy seat belt as claimed in claim 1, wherein said hook and loop material attachment (7) has a "V" shape, joins said criss-cross elastic straps (6), and is designed in a anatomical shape to be a more comfortable attachment that fits in between a pregnant woman's legs.

5. A pregnancy seat belt as claimed in claim 1, wherein said seat mat is secured with said two nylon straps (8) at a rear edge (5) of said mat, one on each side of said seat mat.

6. A pregnancy seat belt as claimed in claim 1, wherein said plastic buckles (9) are attached to an elongate securing strap (12) via two straps (11) and female plastic buckles (10), and fastening buckles (13) are attached to said elongate securing strap (12) for fastening opposite ends of said elongate securing strap (12) about a lower portion of a back portion (18) of the vehicle seat (16), thereby securing said seat mat (2) in place on a lower seat portion (15).

7. A pregnancy seat belt as claimed in claim 1, wherein said plastic buckles (9) used are quick release buckles, intended for quick install and removal for a pregnant woman if the pregnant woman desires to allow others to use a car seat without using the pregnancy seat belt (1).

8. A pregnancy seat belt as claimed in claim 1, wherein said criss-cross elastic straps (6), said two nylon straps (8), and said elongate securing strap (12) are heavy-duty straps to secure to the vehicle seat (16).

* * * * *